(12) United States Patent
Petruchik et al.

(10) Patent No.: US 6,212,337 B1
(45) Date of Patent: *Apr. 3, 2001

(54) COMPOUND IMAGE FORMATION

(75) Inventors: Dwight J. Petruchik, Honeoye Falls; Marcello D. Fiscella, Fairport, both of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,958

(22) Filed: Dec. 22, 1997

(51) Int. Cl.$^7$ .............................. G03B 17/24; G03B 41/00
(52) U.S. Cl. ............................................. 396/311; 396/322
(58) Field of Search .................................... 396/311, 315, 396/316, 322

(56) References Cited

U.S. PATENT DOCUMENTS

| | | | |
|---|---|---|---|
| 4,678,299 | 7/1987 | Harvey | 396/207 |
| 5,006,878 | 4/1991 | Cloutier | 396/311 |
| 5,086,310 | * 2/1992 | Iwashita et al. | 396/311 |
| 5,151,726 | 9/1992 | Iwashita et al. | 396/311 |
| 5,170,198 | 12/1992 | Cannon | 396/60 |
| 5,187,512 | 2/1993 | Kirkendall | 396/340 |
| 5,189,453 | 2/1993 | Boyd | 396/317 |
| 5,204,707 | 4/1993 | Harvey | 396/60 |
| 5,319,403 | 6/1994 | Sakamoto et al. | 396/311 |
| 5,404,196 | 4/1995 | Terashita et al. | 396/311 |
| 5,587,752 | 12/1996 | Petruchik et al. | 396/315 |
| 5,613,165 | 3/1997 | Dobbs et al. | 396/6 |
| 5,696,996 | * 12/1997 | Mintzberg | 396/6 |
| 5,758,216 | * 5/1998 | Arnold | 396/311 |

FOREIGN PATENT DOCUMENTS

| | | |
|---|---|---|
| 5-188474 | 1/1992 | (JP) . |
| 9-138483 | 5/1997 | (JP) . |

\* cited by examiner

*Primary Examiner*—David M. Gray
(74) *Attorney, Agent, or Firm*—Gordon M. Stewart; David A. Novais

(57) ABSTRACT

A method of forming a combined image from a filmstrip carrying a plurality of user exposed first images and second image information defining a second image. A user exposed image associated with a predetermined designation for referencing the second image, is identified. The user exposed image associated with the designation is scanned to obtain a resulting scanned image signal. Second image information from the filmstrip is read to obtain a second image signal. A combined image is formed from the resulting scanned image signal and the read second image. A filmstrip and film assemblage is provided which can be used in a method of exposing according to the present invention, then developed and processed according to the above method.

20 Claims, 6 Drawing Sheets

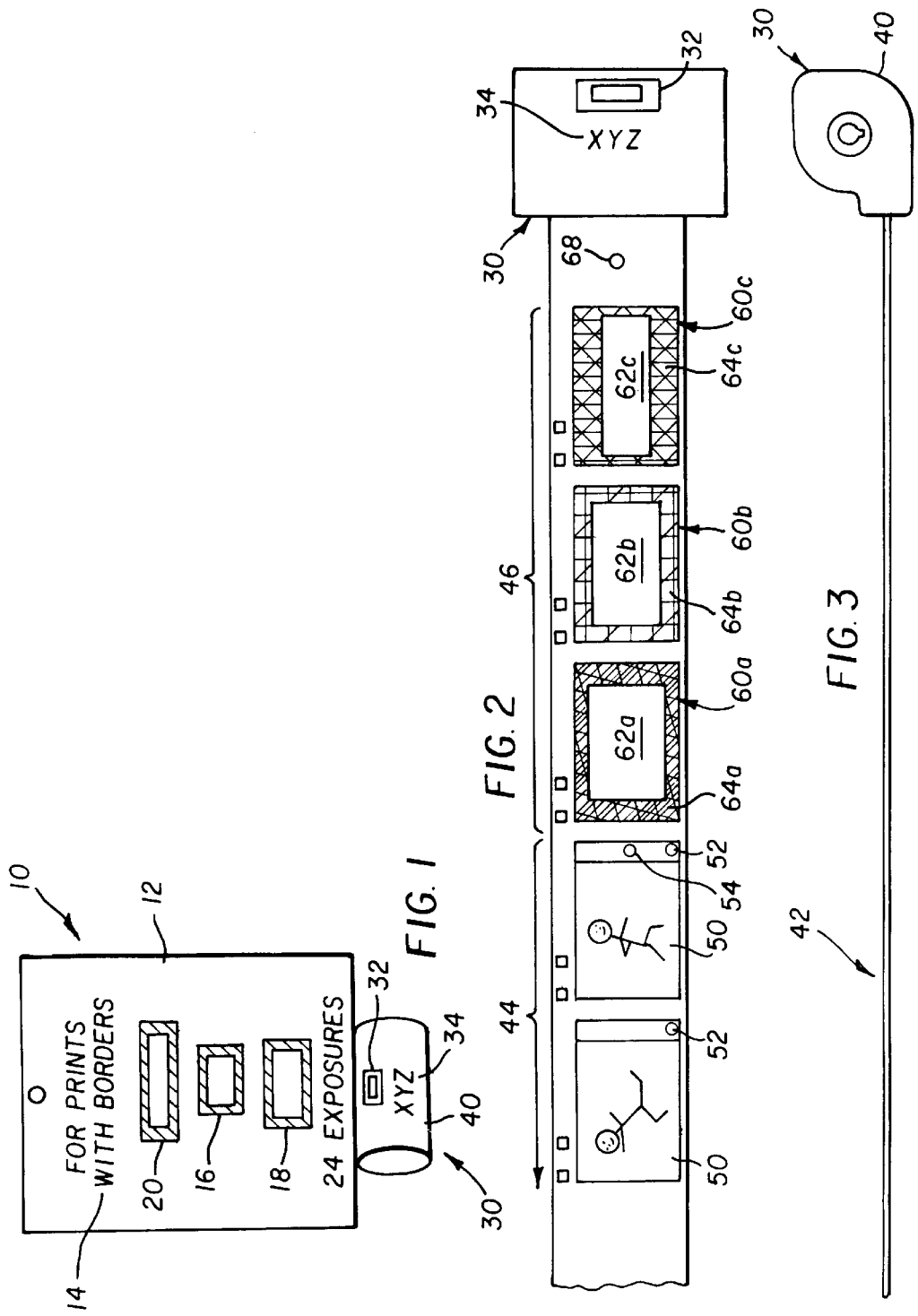

COMPOUND IMAGE FORMATION

FIELD OF THE INVENTION

This invention relates to photography, and in particular to a means by which user expose images on a photographic film can be readily combined with other images such as preselected image perimeters.

BACKGROUND OF THE INVENTION

In modern photography, a user typically purchases an unexposed photographic filmstrip at a point of sale, loads it into a camera, and exposes one or more images onto the filmstrip. When the filmstrip has been completely exposed, the user provides the exposed filmstrip to a service facility (such as a retail outlet) where it is chemically developed to provide the images in an essentially fixed, unalterable form. These images are usually printed at the service facility by an optical printer to provide the user with one or more positive prints of each user exposed image. So called digital processing labs have also previously been disclosed in which, following developing, the user images on the filmstrip are scanned to obtain corresponding image signals (typically digital image signals), which can then be processed as desired. The positive prints can then be directly printed from the resulting image signal using any known type of printers, such as laser printers, inkjet or thermal dye transfer printers. Such digital processing labs offer advantages including the ability to digitally enhance or correct user images, and to additionally provide the user image on a digital storage medium or transmit it to remote locations. Data used in controlling developing or processing conditions (such as print exposure or print size) can be provided from optical or magnetic codes on the film. Such techniques are described, for example, in U.S. Pat. Nos. 5,204,707, 4,678,299, 5,006,878, 5,151,726, 5,319,403 and 5,404,196.

It has been previously known to combine user images with other images. For example, U.S. Pat. No. 5,189,453 describes a method to pre-expose a portion of an image frame of a filmstrip. U.S. Pat. Nos. 5,187,512 and 5,613,165 disclose arrangements for pre-exposing all user image frames of a filmstrip with a single object such as a perimeter. During such pre-exposure a mask is provided to prevent exposure of a portion of each image frame which will be exposed by the user. A complementary mask is provided in the camera in which a user exposes such a filmstrip to prevent the pre-exposed border from again being exposed by the user. Thus, for example, a user can obtain all his images with a border with a holiday or other occasion theme, which is predetermined by the film manufacturer. Such techniques though, require masking during the pre-exposure step and in the camera during exposure of user images, and it is necessary to ensure proper alignment of each pre-exposed region with the camera mask. Further, the same single pre-exposed object will appear in all the user images. This limits the user's choices to either buying such a pre-exposed film or a regular film, after which point the choice is irrevocable.

There has recently been introduced a camera system known as the Advanced Photo System ("APS"). In this system, a transparent magnetic layer on the film records data such as the type described in the above patents. A code can also be recorded which indicates to a developer that the final print desired by the user is in one of three formats namely, HDTV, conventional, or panoramic (H, L, or P, respectively). The developer crops and enlarges the image during printing accordingly. If a standard pre-exposed border was provided for all image frames as in the above described systems, this would result in some printed images having the border cut-off depending upon where the image is cropped.

It would be desirable then, to provide a means by which a user could form a combined image from a user exposed image and another image (such as an image perimeter), without the need for masks during pre-exposure or in the camera. It would further be desirable that the user can select among different ones of other images with which user exposed images can be combined.

SUMMARY OF THE INVENTION

The present invention then, provides a method for processing images on a filmstrip where a second image with which a user may desire to combine with a user exposed image, is provided on a section of the filmstrip different from that occupied by user exposed images. User images to be combined with a second image are identified (such as by means of an associated code) and the combined image is formed at the service facility. An apparatus which can execute methods of the present invention, and a film assemblage for use in such a method, as well as a method for forming a combined image, are further provided.

In particular, in one aspect of the present invention, there is provided a method of forming a combined image from a filmstrip carrying a plurality of user exposed first images and second image information defining a second image. The method comprises identifying a user exposed image associated with a predetermined designation for referencing the second image. A combined image is formed from the user image so identified, and the second image.

Another aspect of the method of the present invention comprises identifying a user exposed image associated with a predetermined designation for referencing the second image. The user exposed image associated with the designation is scanned to obtain a resulting scanned image signal. The second image information is read from the filmstrip to obtain a second image signal. A combined image is formed from the resulting scanned image signal and the read second image.

In a further aspect of the present invention, the method provides for forming a combined image from a filmstrip carrying a plurality of user exposed first images, second image information defining a plurality of different second images, and predetermined different designations associated with different ones of the user exposed images for referencing respective different second images. In this aspect, the user exposed images associated with the predetermined designations and the respective different second images referenced by the designations, are determined. The user exposed images associated with the designations are scanned to obtain resulting user image signals. The second image information is read from the filmstrip. For each of the user images associated with a designation, a combined image is formed from the user image signal and the second image referenced by the designation associated with that user image.

An apparatus of the present invention comprises, in one aspect a code reader to read a predetermined designation associated with a user exposed image. A scanner is provided which scans the user exposed image associated with the designation to obtain a user image signal. An information reader which may be the same or different from the scanner, reads the second image information from the filmstrip to obtain a second image signal. An image processor, in response to an output of the code reader indicating a predetermined designation associated with a user image, forms a combined image from the corresponding user image signal and the second image signal.

The present invention further provides a method of capturing an image in a camera for forming into a combined image. The method uses a photographic film loaded in the camera, which film has an unexposed first region encompassing a first lengthwise extending section of the filmstrip. A second region is provided on the filmstrip which is displaced lengthwise along the filmstrip from the first region and which carries second image information recorded on the film before having been loaded in the camera. This second image information defines a second image comprising an image perimeter. The method using such film, comprises exposing an image on the first region as a user exposed image. A predetermined designation for referencing the second image, is recorded on the filmstrip in association with user exposed image.

In one aspect of an undeveloped filmstrip of the present invention, the filmstrip comprises an unexposed first region encompassing a first lengthwise extending section of the filmstrip. A second region of the filmstrip carries second image information defining at least one image perimeter.

One aspect of a photographic film assemblage of the present invention comprises a light tight housing and a filmstrip disposed within the housing. This filmstrip has an unexposed first region and a second region which carries second image information defining at least one second image. The assemblage further has an indication associated with the cartridge, which indication identifies that a user exposed image on the filmstrip will be combined upon processing of the filmstrip with the second image to form a combined image.

The present invention then, provides a means by which a user can obtain combined images from a user exposed image and another image (such as an image perimeter), without the need for masks during pre-exposure or in the camera. This avoidance of masks also avoids the need to correctly align pre-exposed objects with a mask in the camera. Further, a user can select among different ones of second images with which user exposed images can be combined. The invention provides for the possibility of even electing not to form a combined second image for any particular ones of user exposed images on a given filmstrip, while electing that such combined images are formed from other user exposed images. In any event, the invention further allows the formation of desirable compound images without a service provider having to access desired second images from a remote or local storage facility.

BRIEF DESCRIPTION OF THE DRAWINGS

FIG. 1 illustrates a photographic film assemblage of the present invention;

FIG. 2 is a top view of a filmstrip of the present invention;

FIG. 3 is a side view of the filmstrip of FIG. 2;

DETAILED DESCRIPTION OF THE INVENTION

Figure 4:
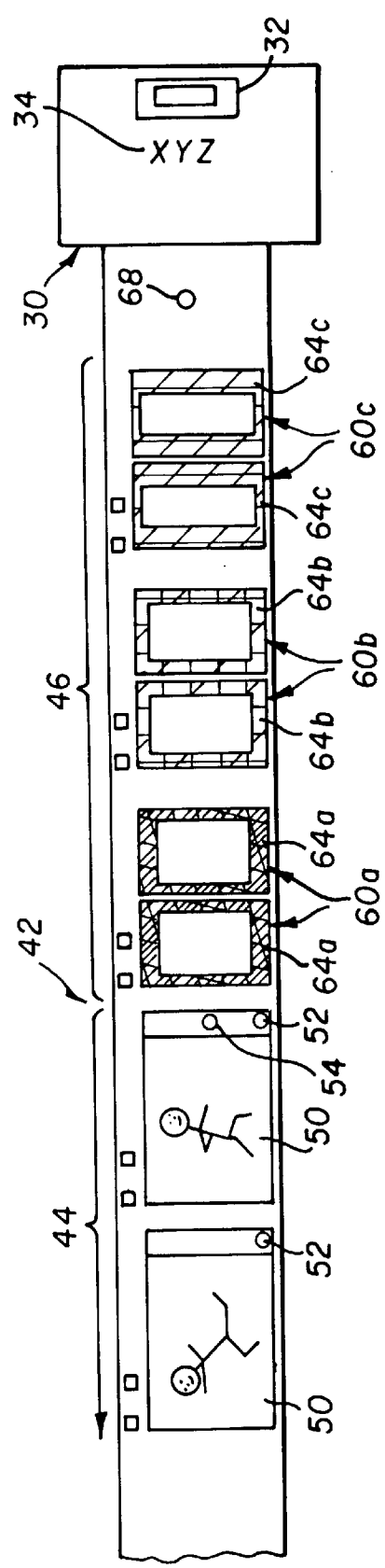
FIG. 4 is a top view of another filmstrip of the present invention.

In the present invention, reference to a combined image formed from two images, means the images are positioned with respect to one another so that they are viewed as one image. For example, a perimeter in a second image may be used as a perimeter for a user image, surrounding and adjacent to the user image. Generally, in the most typical method where the combined image is formed from user and second image signals, each combined image will be a single image data file.

Referring particularly to FIGS. 1–3, a photographic film assemblage 10 of the present invention is illustrated. The film assemblage 10 includes a film cartridge 30 having a light tight housing 40, and a light sensitive filmstrip 42 wound within housing 40 (only part of which is shown in FIGS. 2, 3). Filmstrip 42 has a flexible transparent plastic base carrying one or more layers of a light sensitive silver halide gelatin emulsion, in a known manner for black and white or color films. Cassette 30 may, for example, be a typical 35 mm filmstrip carrying cassette, but is more preferably an APS filmstrip cassette. When filmstrip 42 is an APS filmstrip it carries a transparent magnetic layer along its length. Filmstrip 42 can be unwound from, or wound into, housing 40 in a manner known for 35 mm filmstrips or APS filmstrips.

Filmstrip 42, as sold to a user, includes a first region 44 which is initially unexposed, and a second region 46 carrying second image information in the form of pre-exposed latent optical image frames. First region 44 extends along a leading end of filmstrip 42 while second region 46 extends along a trailing end of filmstrip 42. These pre-exposed latent optical image frames are shown as second images 60a, 60b, 60c. For the sake of clarity, filmstrip 42 is shown with the addition of user exposed image frames 50 (sometimes referenced herein simply as "user images 50"), following chemical development, and unwound from housing 40. The first region 44 encompasses the major part of the length of filmstrip 42, while the second region 46 encompasses a smaller part of the length. For example, only 1 to 3 adjacent second images 60a, 60b, 60c might be present on the pre-exposed second region 46, while the first region is sufficiently long to accommodate 10 to 36 adjacent user images 50 each of a length equal to that of the second image frames 60a, 60b, 60c in FIG. 2. Thus, second region 46 may typically encompass about 2% (and often about 9%) to about 49% (and more typically about 30%) of the length of filmstrip 42. The pre-exposed second images 60a, 60b, 60c include image perimeters 64a, 64b, 64c of different patterns. Further, they differ in that they each have a central opening 62a, 62b, 62c of an aspect ratio corresponding to the aspect ratios of L, H or P APS prints, respectively. Openings 62a, 62b and 62c have no pre-recorded image material in their areas, although they could have such material provided it was readily distinguishable from image perimeters 64a, 64b, 64c. For example, the openings could optionally be solid blue or black.

Film assemblage 10 additionally includes display 12 to which cassette 30 is attached. Display 12 may be a rigid cardboard or plastic sheet, for example, carrying various printed indicia. For example, the text 14 provides an indication associated with cartridge 30, and hence filmstrip 42, identifying that a user exposed image 50 on the filmstrip 42 will be combined with a second image 60a, 60b, 60c on the filmstrip when processed. FIG. 1 illustrates this for the case of an APS cartridge 30. Display 12 also carries an indication in the form of visible illustrations 16, 18, 20 (that is, visible to the human eye) showing the image perimeters 64a, 64b, 64c, respectively, which will be added to user images which are designated by an APS camera to be printed in L, H, or P format, respectively. In this manner a user can see the different borders 64a, 64b, 64c that will be combined with a user image when a user selects an L, H or P APS type print designations for any particular image. In an alternative arrangement, display 12 may be dispensed with and the cartridge 30 by itself located at a point of sale in close physical association with a permanent display carrying all the information of display 12.

The user selection for an L, H or P print is done by using a camera control to associate an appropriate L, H or P designation (magnetic or optical) with each user exposed image, in a known manner. This association can be done, for example, by providing the designation adjacent to the associated image (particularly for optical designations) or by providing it at the same location as the associated image (particularly for magnetic designations). For example, when only a code 52 is present, this can be taken as indicating a user wishes an L aspect ratio print (and hence the combined image is to have a perimeter 64a). When codes 52, and 54 are present together in association with a user frame 50, this can be taken as indicating a user wishes an H aspect ratio print (and hence the combined image is to have a perimeter 64b).

Similar to the illustrations 16, 18, 20, an illustration 32 on housing 40 can carry an additional similar indication in the form of a miniature version of the one or more image perimeters 64a, 64b, 64c (only one of which is shown on housing 40 in the drawings). Further, an indication for the same purposes can also be carried on housing 40 in the form of printed identification 34 ("XYZ") which indicates to a user and/or a service outlet that the contained filmstrip 42 is to be processed so that user images of designated L, H or P format are to be combined with second images 60a, 60b, 60c respectively. This identification has been predetermined such that a user or service outlet, upon reading the identification, will know that such a filmstrip is to be processed in the foregoing manner. Instead of, or in addition to, the illustrations 32 or 34, a predetermined identification providing the same information can be provided as a machine readable optical (for example, bar code) or magnetic code 68. Code 68 would also be provided on filmstrip 42 as it is sold in the assemblage of FIG. 1 (that is, before exposure of the user images), or optionally could be written by a camera possessing a suitable control and magnetic or optical writer.

Figure 5:
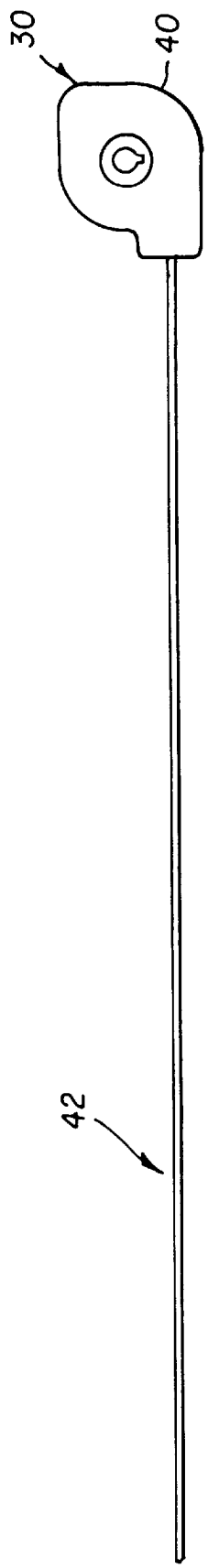
FIG. 5 is a side view of the filmstrip of FIG. 4.

Referring to FIGS. 4 and 5, the filmstrip 42 shown therein is essentially the same as that of FIGS. 2 and 3. However, in the filmstrip 42 of FIGS. 4 and 5, two image perimeters 64a, 64b and 64c are provided, each of which pair occupies the same space as a user image 50. The two members of each pair, such as the pair of perimeters 60a, will typically be of the same dimensions but carry different image information. In such case, codes 52, 54 should provide a reference to which one of the perimeters 60a, 60b, 60c (images) of a given pair is to be combined with a user image 50. For example, as described above code 52 can be taken as indicating that an L aspect ratio print is to be made, and also that the combined image is to have a perimeter 64a. However, the code 52 should contain an additional code indicating which of the image perimeters of the pair 64a is to be combined. Such additional code may be equivalent to a "1" or "0".

Figure 6:
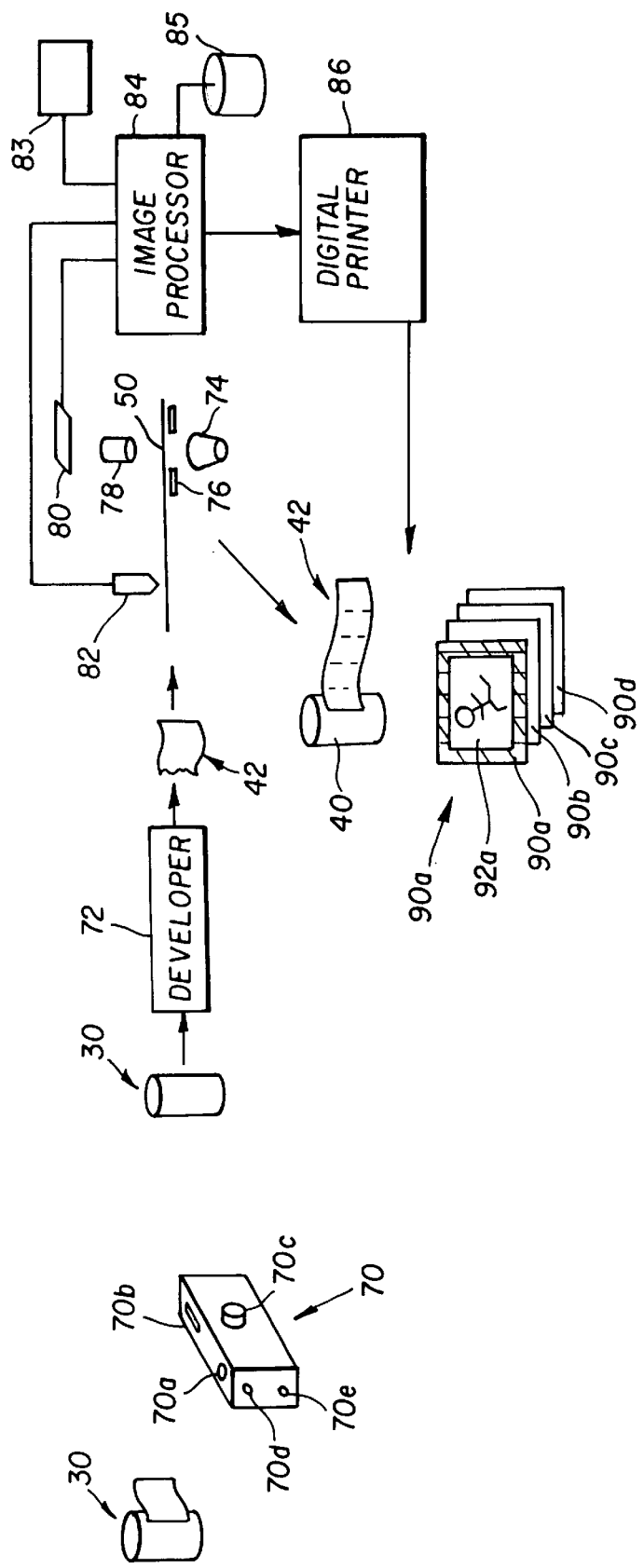
FIG. 6 schematically illustrates an apparatus of the present invention and its use.

Referring now to FIG. 6 in particular, there is illustrated a method of capturing the present invention, as well as an apparatus for forming a combined image. A method of forming a combined image using apparatus shown in FIG. 6 will be described in more detail below. In particular, film cartridge 30 will be used in a conventional APS type camera 70 which has the usual light tight housing to receive cartridge 30, a shutter control 70a, a format control 70b for a user to designate if the user desires an L, H, or P format print for each user exposed image, and a lens system 70c. Depending upon the position of control 70b a corresponding code (optical or magnetic) is written on filmstrip 42 in association with each user exposed image 50. Camera 70 further has an override control 70d which, when selected, records a magnetic or optical code in association with a user image which is used to instruct the service provider to not combine the associated image with any second image 60. A second image selector control 70e allows a user to select between members of a pair of borders 64a, 64b, 64c if such pairs are present on filmstrip 42 (in which case, display 12 can show the different borders of each pair in reduced size, for each of the L, H and P formats, along with a designation (such as "0" or "1" ) by which a user can identify such border in a camera. At a service provider, there is provided a chemical developer 72 which can chemically process a filmstrip 42 using a black and white, color negative, or color reversal process (depending upon which type of process filmstrip 42 is intended for), to yield images in fixed unalterable form on filmstrip 42.

A reader 82 is provided to read optical or magnetic codes associated with filmstrip 42, such as codes 52, 54, and 68. A scanner includes a film gate 76 to position an image frame, such as a user image 50, so that light from a light source 74 passes through the image so positioned, through a lens assembly 78 and onto a sensor 80. Sensor 80 can be a line sensor or two-dimensional area array sensor, with light source 74 being constructed appropriately in a known manner. Sensor 80 then, outputs an image signal corresponding to the image positioned within gate 76. Light source 74 includes filters for providing light in each of the red, green and blue color channels sequentially. The scanner sensor 80 and reader 82 provide their outputs to an image processor 84. Image processor 84 contains any necessary analog to digital converters to convert analog signals from sensor 80 to digital signals, and further includes a suitably programmed general purpose microprocessor and/or hardware equivalents. By suitably programmed in this context, is meant programmed to enable image processor 84 to carry out the functions as required by it in this application. Image processor 84 has access to a memory 85, which includes a solid state random access memory (RAM) as well as magnetic and/or optical storage devices. An input device 83, allows a human operator to input codes or further instructions to image processor 84. Input device 83 may be a keyboard, mouse, or other suitable input device.

Image processor 84 is connected to provide output image signals to a digital image printer 86. Printer 86 may be any suitable printer such as inkjet, laser, CRT and the like.

Figure 7:
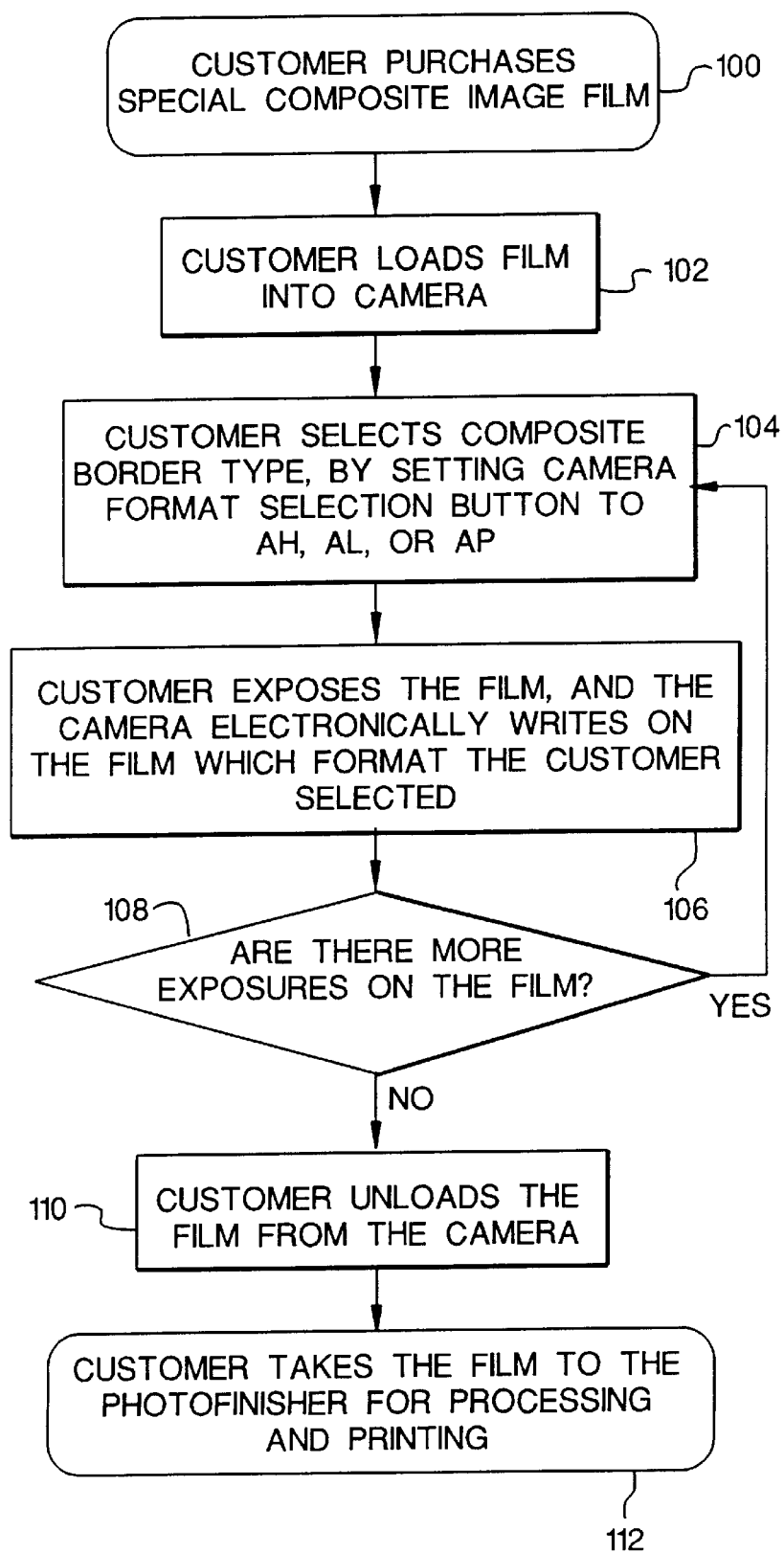
FIG. 7 is a flowchart illustrating a method of capturing an image of the present invention in a camera for forming into a combined image.

Referring now to FIGS. 6 and 7, a method of capturing an image in a camera for forming into a combined image, will now be described. First a customer will purchase (100) a cartridge with attached display 12. In particular, film cartridge 30 is detached by a user from display 12 if necessary. It can then be loaded (102) into camera 70 in a known manner. User images 50 can then be exposed on the previously unexposed first region 44 of filmstrip 42 by activating shutter control 70a in a well known manner. The user also positions switch 70b to record on filmstrip 42 in association with each user image, codes 50 and 52, for example, to indicate in which of the H, L or P formats a given user image 50 is to be printed. If perimeter pairs 64*a,* 64*b,* 64*c* are provided on filmstrip 42, a user can select the desired one of a pair for each image 50 by using control 70*e*. Alternatively, if a user desires no image perimeter, control 70*d* can be used to provide an appropriate bit within codes 52, 54 for any given user image 50. This H, L, or P selection also serves as the selecting (104) of the second image 64*a,* 64*b,* 64*c* that will be used with a user image 50 to form the combined image. The H, L or P indicating codes can be used as a part or all of the predetermined designation associated with the user exposed images 50, for referencing the second images 60*a,* 60*b,* 60*c*. For example, if it is to be assumed that all filmstrips 42 are of the type from which combined images will be formed (for example, such filmstrips 42 have been batched together) then such H, L or P codes are a sufficient designation. If on the other hand, regular filmstrips which may be of the APS type but from which combined images are not to be formed, are processed in a manner intermixed with filmstrips 42, the H, L, P designations will probably not be sufficient in themselves to serve as the predetermined designations. The other part of such predetermined designations is the code 68, or the illustration 32, or the printed identification 34, or an entry provided by the user on a customer order form or envelope which is normally delivered to the service outlet by the user with the user exposed images 50 (note that display 12 is not normally provided to the service provider with a filmstrip 42 following exposure by the user). Such additional information can serve as part or the required predetermined designation.

Following the selecting (104), a user image is exposed on first region 44 by a user activating shutter control 70*a*. Also, camera 70 writes (106) the codes 50, 52 indicating the selected format, on filmstrip 42 adjacent such user image 50 (the "associated" user image). This is accomplished by a suitably controlled illumination source (for an optical code) or magnetic write head (for a magnetic code) inside camera 70. If there is still sufficient room on filmstrip 42 for more user exposures 50 (108), the selection, exposure and code writing steps are repeated. When there is no further room for more user exposures 50, the filmstrip will be rewound by camera 70 back inside housing 40. Cartridge 30 can then be unloaded (110) from camera 70, and the user takes (112) the cartridge 30 to a service outlet ("photofinisher") for developing and printing.

Figure 8:
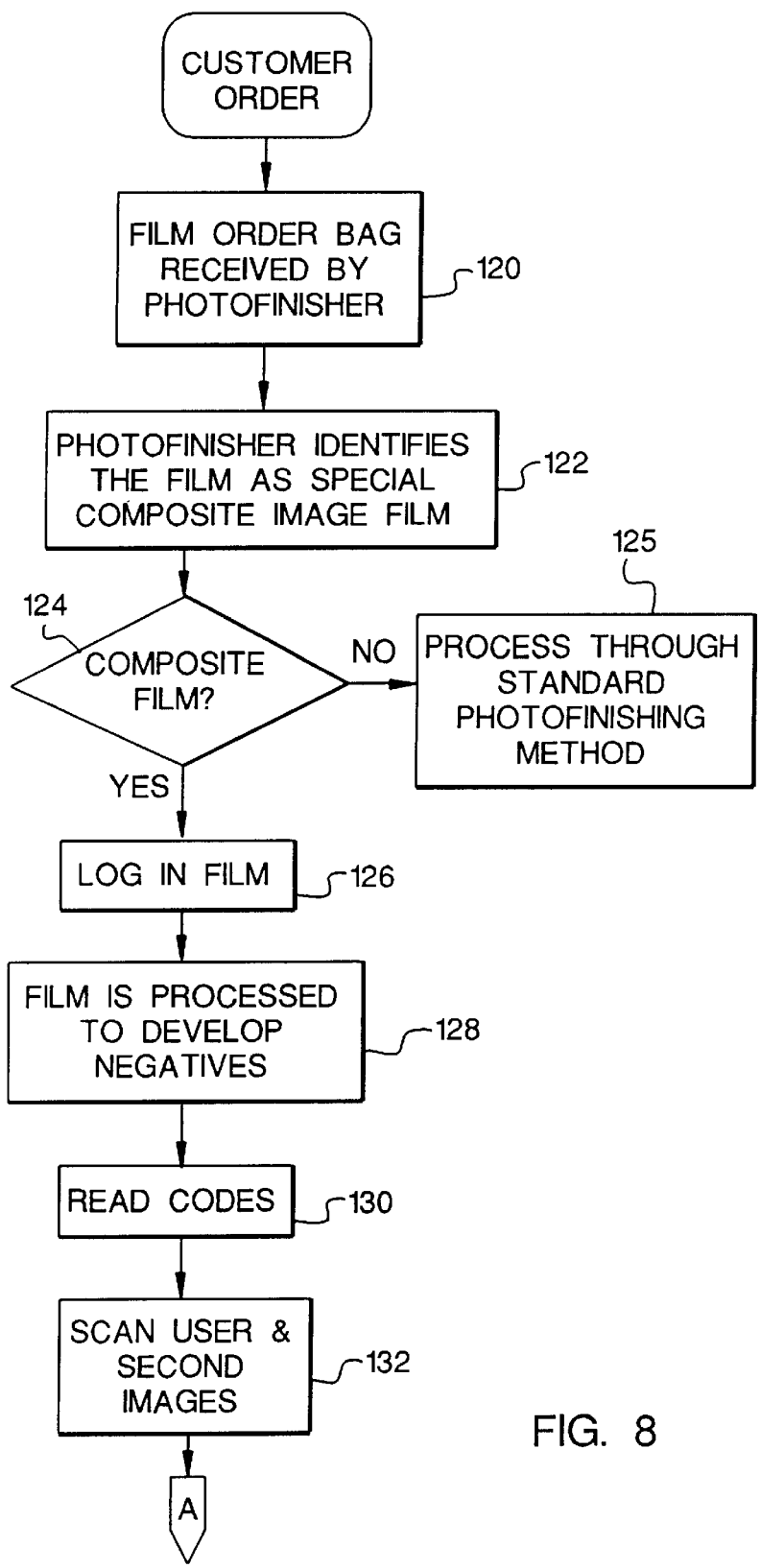
FIGS. 8 and 9 are flowcharts illustrating a method of forming a combined image, of the present invention.
Figure 9:
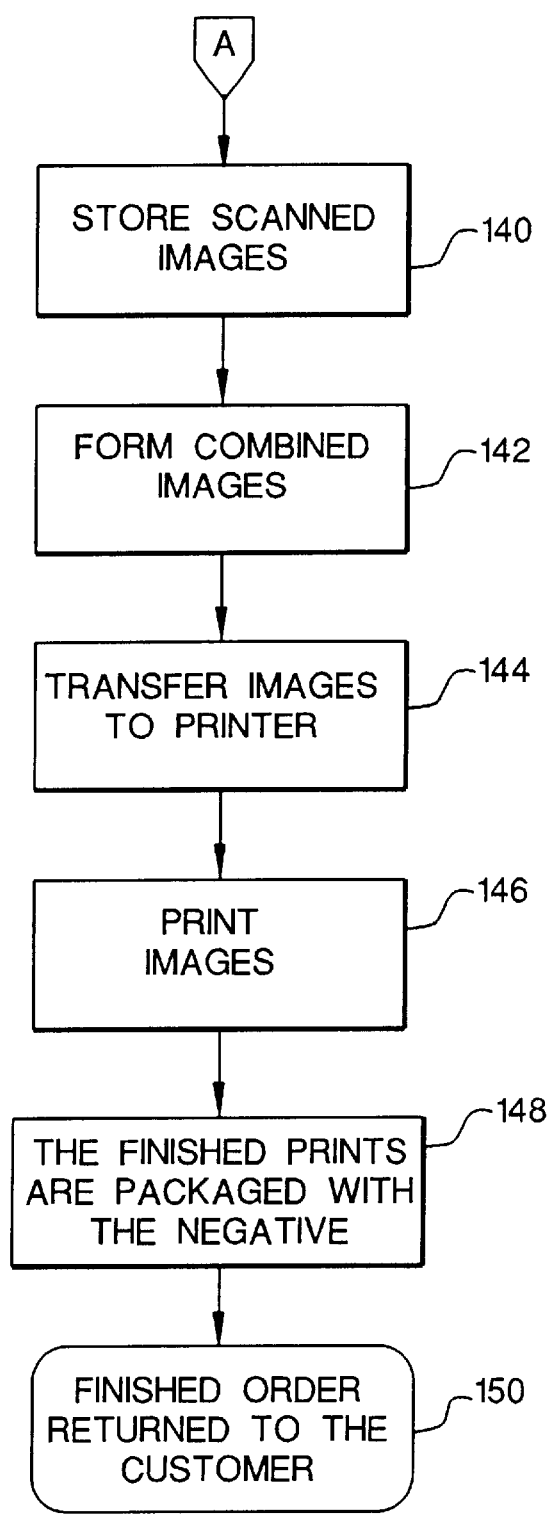

Referring now to FIGS. 6 and 8–9 in particular, a method of forming a combined image from a filmstrip 42 will now be described. The customer order is received (120) at the photofinisher. Normally the customer order will include cartridge 30 carrying both the pre-exposed second images 60*a,* 60*b,* 60*c* and user images 50, as well as an order envelope (not shown) carrying cartridge 30. The order envelope or bag, will carry such information as the user's name and address, how many prints are to be provided from each user image, and special requests such as enlargements or requests for digitized images on a suitable storage medium. The bag is received (122) by the photofinisher. For any given cartridge the photofinisher checks the film (122) to determine (124) whether the filmstrip 42 is one from which compound images are to be formed from user images 50 and second images 60*a,* 60*b,* 60*c*. If it is a regular film from which compound images will not be formed, it is processed (125) to yield prints or other positive images, such as transparencies, from each user image 50 without attempting to combine images from filmstrip 42. This determination can be made in a number of ways. For example, this can be done by visual inspection of illustration 32, visual or machine reading of printed identification 34, visual or machine reading of instructions on a customer order bag, or by machine reading of the code 68. Any machine reading can be performed by reader 82 (for magnetic codes) or by the scanner coupled with suitable code recognition software in image processor 84.

Filmstrip 42 is chemically developed (128) in developer 72 to yield the latent user images 50 and latent second images 60*a,* 60*b,* 60*c* in visible permanent form. In FIG. 6 the developing (128) is shown occurring before reader 82 has read any codes. However, it will be appreciated that the developing (130) could occur first, and the determination (122) then could be made based on codes read from developed filmstrip 42.

Codes, such as codes 50, 52, 68, or printed identification 34 (where it is a machine readable code) are read by reader 82. Alternatively, or in addition, any codes input at input device 83 are also read by processor 84. Such operator input codes can include printed identification 34 (where it is not a machine readable code) or a predetermined code input by the operator indicating that compound images are to be formed, based on the operator's visually identifying illustration 32. User images 50 and second images 60*a,* 60*b,* 60*c* are scanned one by one at gate 76 to obtain corresponding user image signals and second image signals. Again, the order of scanning is not critical, although typically the second images 60 may be scanned first.

Scanned image signals are stored (140) in memory 85. Scanned user image signals will be combined (142) with image signals corresponding to second images 60*a,* 60*b,* 60*c* in accordance with the respective designations associated with user images 50. In particular, image processor 84 identifies user exposed images 50 associated with predetermined different designations for referencing different ones of the second images 60*a,* 60*b,* 60 *c*. The designations used in this situation for APS film, are the L, H, P indicating codes such as codes 52, 54. That is, as described above, it has been predetermined that in the case of filmstrip 42 the L, H and P codes will themselves designate that a combined image is to be formed with second images and in particular with image perimeters 64*a,* 64*b,* 64*c* respectively.

Image processor 84 will form (142) as indicated by the described designations, and transfer these (144) to printer 86. Developed filmstrip 42 (or cut negatives or positive transparencies produced therefrom) can then be packaged (148) with the prints of combined images 90 for delivery (150) to the user (sometimes referenced herein as the "customer").

Image processor 84 can form combined images 90*a,* 90*b,* 90*c,* 90*d* in any of a number of predetermined ways which may require image modification. For example, either or both of a user image 50 or image perimeter 64 can be scaled so that the user image just fits within the indicated image border. Alternatively, the user image 50 could be cropped at around its perimeter as required so that only a portion of the user image is used, or an inside margin of the image perimeter 60 could be cropped. In any event, the combined images 90 formed will be of the aspect ratio format selected by the user and be surrounded by an adjacent image perimeter 64. It will also be appreciated that particularly in the case of the image perimeters 64 in FIG. 4, resizing of the perimeter or user image may be required. However, keeping image modifications as simple as possible (for example, cropping to size) minimizes computational power and time required by image processor 84.

Various modifications can, of course, be made to the above described methods and apparatus. For example, rather than using an image perimeter as a second image, some other type of image can be used which it is desired to combine with a user image. One example of this will be a second image to act as an image border. This will be used to form at least a portion of the perimeter of the combined image (that is, it will form an image border such as a caption or display along and adjacent to one or more edges of the combined image). Another modification is to provide the second image information in another form on the filmstrip. For example, the second image information could be provided as magnetically encoded data on the transparent magnetic layer of an APS film, or as optically encoded data rather than as an actual optical image. In either event, the second image data is immediately available from the filmstrip, without image processor 84 having to access local or remote image data banks. In another variation, the predetermined designation may be one which is associated with user images simply by being associated with the filmstrip (for example, by being on filmstrip 42 or the housing 40). That is, a general code, such as an appropriate predetermined value of code 68, could be used to designate that user images on such an identified filmstrip are to be combined with second images in a predefined manner (for example, forming an image perimeter on a combined image as described above). As already mentioned, the predetermined designation may be in various forms. For example, this may be machine readable optical or magnetic code on the filmstrip, on a housing of a cartridge containing the filmstrip, or on other packaging associated with the filmstrip when delivered to a service provider for developing. Visual designations may also be used in place of the foregoing machine readable codes, in which case an operator may be required to input such identifications into the processor or otherwise indicate to the processor that the combined image is to be formed.

The invention has been described in detail with particular reference to certain preferred embodiments thereof, but it will be understood that variations and modifications can be effected within the spirit and scope of the invention.

Parts List

10 film assemblage
12 display
14 text
16 visible illustrations
18 visible illustrations
20 visible illustrations
30 film cartridge
32 visible illustration
34 predetermined identification
40 light tight housing
42 light sensitive filmstrip
44 first region
46 second region
50 user exposed images
52 code
54 code
60 second image frames
62a central opening
62b central opening
62c central opening
64a image perimeter
64b image perimeter
64c image perimeter
68 code
70 camera
70a shutter control
70b format control
70c lens system
70d override control
70e image selector control
72 chemical developer
74 light source
76 film gate
78 lens assembly
80 sensor
82 reader
83 input device
84 image processor
85 storage
86 image printer
90 user prints

What is claimed is:

1. A method of forming a combined image from a filmstrip carrying a plurality of first images which have been exposed by a user and second image information defining a predetermined pre-exposed second image, the method comprising the steps of:

identifying an exposed first image from said plurality of first images which is associated with a predetermined designation for referencing the predetermined pre-exposed second image;

scanning the first image associated with the designation to obtain a resulting scanned first image signal;

reading the second image information from the filmstrip to obtain a second image signal; and forming a combined image from the resulting scanned first image signal and the read second image;

wherein the second image comprises an image border, and wherein the combined image comprises at least a portion of the first image and at least a perimeter portion defined by the image border.

2. A method according to claim 1 wherein the predetermined designation comprises a code associated with the filmstrip.

3. A method according to claim 2 wherein the code is a magnetic code on the filmstrip.

4. A method according to claim 2 wherein the predetermined pre-exposed second image comprises an optical second image, and the reading step comprises the step of scanning the second image.

5. A method according to claim 4 wherein the scanned first image and the second image are at different locations displaced lengthwise along the filmstrip.

6. A method according to claim 1 additionally comprising the step of modifying the first image signal or the second image signal before forming the combined image.

7. A method according to 6 wherein the modifying step is performed at least in part in accordance with the predetermined designation associated with the exposed first image.

8. A method according to claim 1 further comprising a plurality of said predetermined pre-exposed second images.

9. A method according to claim 8 wherein the second image information for the plurality of second images is located on a second region of the filmstrip which is lengthwise displaced from a first region of the filmstrip carrying the first images.

10. A method of forming a combined image from a filmstrip carrying a plurality of first images which have been exposed by a user, second image information defining a plurality of different pre-existing exposed second images, and predetermined different designations associated with different ones of the user exposed first images for referencing respective different second images, the method comprising the steps of:

provviding said second images in the form of image perimeters having different patterns, wherein each of said image perimeters comprises a central opening having a different aspect ratio;

identifying user exposed first images associated with the predetermined designations and the respective different second images referenced by the designations;

scanning the user exposed first images associated with the designations to obtain resulting first image signals;

reading the second image information from the filmstrip to obtain a second image signal; and for each of the user exposed first images associated with a designation, forming a combined image from the first image signal and the second image referenced by the designation associated with that user exposed first image by locating said user exposed first image within said central opening.

11. A method according to claim 10 wherein the designations comprise different codes on the filmstrip.

12. A method according to claim 10 wherein the second image information comprises a plurality of optical second images, and the reading step comprises scanning the optical second images.

13. A method according to claim 12 wherein the user exposed first images are located on a first region of the filmstrip and the second images are located on a second region of the filmstrip which is displaced lengthwise along the filmstrip from the first region.

14. A method according to claim 13 wherein the second region of the filmstrip is adjacent an end of the filmstrip.

15. A method according to claim 10, additionally comprising the step of resizing at least one of the user exposed first image signal and the second image signal.

16. A method according to claim 10 wherein the second image information is an optical second image, and the reading step comprises the step of scanning the optical second image.

17. An apparatus for forming a combined image from a filmstrip carrying a plurality of user exposed first images and second image information defining a predetermined second image, the apparatus comprising:

a code reader to read a predetermined designation associated with a user exposed first image;

a scanner, which scans the user exposed first image associated with the designation to obtain a first image signal;

an information reader which may be the same or different from the scanner, and which reads the second image information from the filmstrip to obtain a second image signal; and an image processor which, in response to an output of the code reader indicating a predetermined designation associated with a user exposed first image, forms a combined image from the corresponding first image signal and the second image signal;

wherein the second image is an image perimeter and the image processor forms a combined image in which at least a portion of the user exposed first image is positioned inside the second image perimeter.

18. An apparatus according to claim 17 wherein the code reader reads a magnetic code on the filmstrip.

19. An apparatus according to claim 17 wherein the image processor, in forming the combined image, modifies at least one of the first image signal or the second image signal.

20. An apparatus according to claim 19 wherein the modifying includes scaling or cropping.

* * * * *